United States Patent [19]

Oltendorf

[11] Patent Number: 4,469,996

[45] Date of Patent: Sep. 4, 1984

[54] INPUT CONTROL CIRCUIT FOR A STEP MOTOR

[75] Inventor: Norman E. Oltendorf, Algonquin, Ill.

[73] Assignee: Bodine Electric Company, Chicago, Ill.

[21] Appl. No.: 437,493

[22] Filed: Oct. 28, 1982

[51] Int. Cl.³ ............................................. H02K 29/04
[52] U.S. Cl. ....................................... 318/696; 318/685
[58] Field of Search ................................. 318/696, 685

[56] References Cited

U.S. PATENT DOCUMENTS 3,411,058 11/1968 Madsen et al. ...................... 318/696
3,579,279 5/1971 Inaba et al. .......................... 318/696

Primary Examiner—J. V. Truhe
Assistant Examiner—Saul M. Bergmann
Attorney, Agent, or Firm—Allegretti, Newitt, Witcoff & McAndrews, Ltd.

[57] ABSTRACT

An input control circuit for a step motor is disclosed. The circuit includes three separate counters for selectively monitoring command pulses and motor pulses such that the rate of acceleration and the initial point of deceleration are independent of (i) the entry rate of command pulses and (ii) the entry timing. This permits operation of the step motor with an undedicated source of command pulses, e.g., a microprocessor.

10 Claims, 4 Drawing Figures

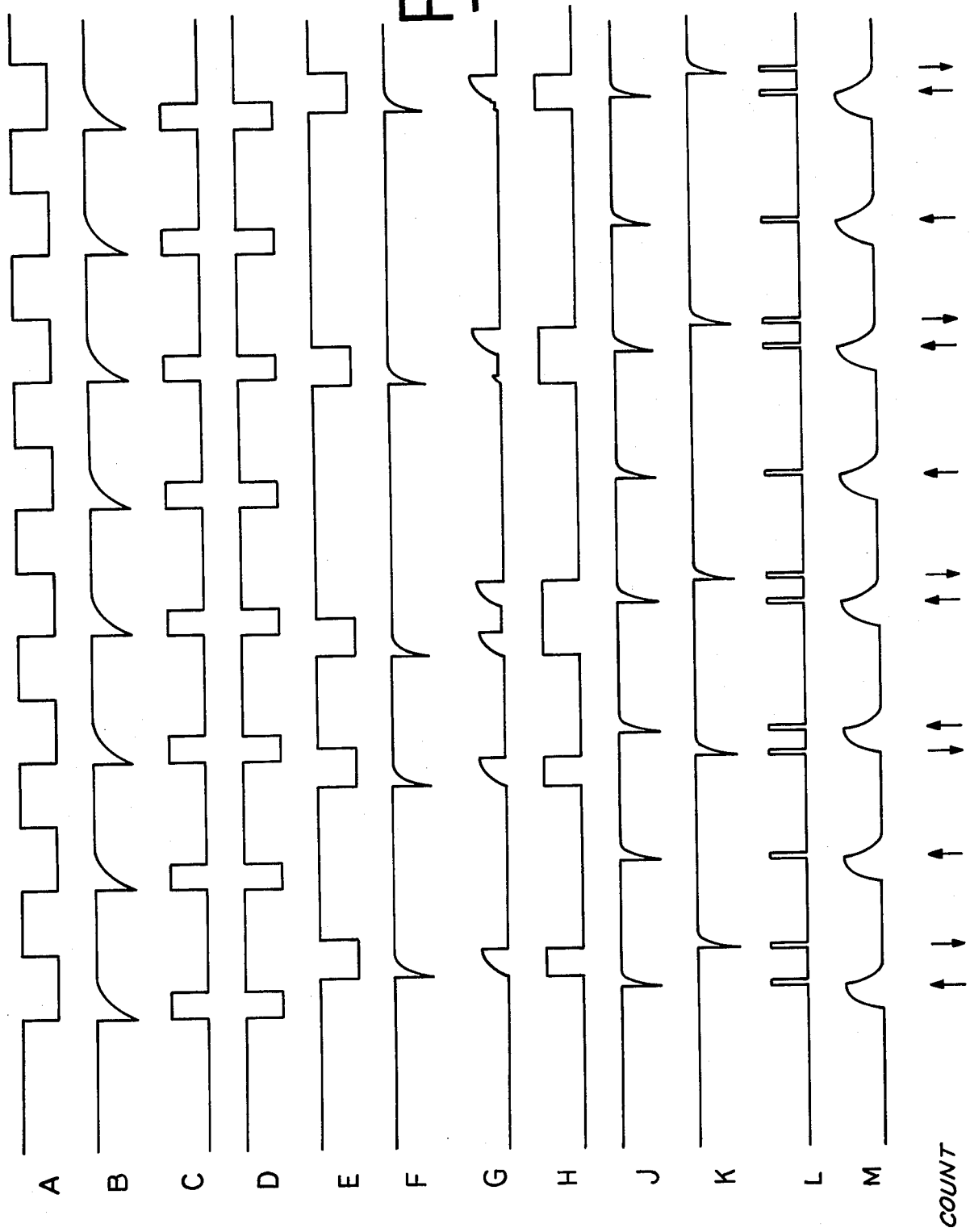

INPUT CONTROL CIRCUIT FOR A STEP MOTOR

BACKGROUND OF THE INVENTION

The present invention relates generally to step motors and more particularly to input control circuit for a step motor wherein command pulses (representing the number of motor steps to be taken) can be received from an undedicated source.

As is well-known in the art, a step motor operates by movement in rotational increments or steps. The number of steps to be taken in any particular application is inputted to the control circuitry of the step motor as shown, for example, in U.S. Pat. Nos. 4,119,901 and 4,119,902. The input signals are commonly referred to as command pulses, and each command pulse represents one step of motor movement. The command pulses can be generated by any one of numerous means, such as a microprocessor programmed to run a series of step motors.

Step motors have two modes of operation, low speed and high speed. High speed operation is commonly referred to as "slewing". In each mode, the step motor initiates and terminates movement at an "error free start stop" speed, commonly referred to as "EFSS".

More particularly, the step motor begins stepping as command pulses are received. In response to the command pulses, the drive circuitry of the step motor generates motor pulses on a one-for-one basis, and these motor pulses energize the windings of the step motor and effect operation thereof. The step motor reaches "EFSS" speed quickly (usually by the third motor pulse) and then further accelerates. After a time, deceleration is initiated and continues until "EFSS" speed is again reached. The step motor then stops. Slewing is achieved only when the number of steps to be taken is sufficient to permit acceleration to full or slew speed.

As shown and described in U.S. Pat. Nos. 4,119,901 and 4,119,902, the rate of acceleration is determined by the difference between the number of command pulses received and the number of motor pulses issued. The digital representation of this difference is converted to an analog voltage, which is applied to a voltage-controlled oscillator. The magnitude of the analog voltage sets the motor pulse issuance rate.

Thus, the acceleration/deceleration pattern is controlled by the rate of inputting command pulses. When slew speed is reached, the command pulse source is issuing command pulses at a fixed rate, equivalent to the motor pulse rate. The analog voltage received by the voltage-controlled oscillator is therefore constant, and slew speed is properly and accurately maintained.

However, the command pulse source must remain dedicated or married to the input circuitry of the step motor throughout the operation. In other words, the step motor is incapable of proper operation unless the command pulse source remains "on line" throughout the operation sequence, i.e., from receipt of the first command pulse through initiation of deceleration. As such, the input circuitry of the step motor cannot be preloaded, i.e., the command pulse cannot be inputted prior to operation of the step motor.

This incapability on the part of the step motor results in a virtual forfeiture of the capability offered by a microprocessor when used as a command pulse source. The microprocessor has more than sufficient capacity to act as the command pulse source for numerous step motors. However, since the microprocessor must remain dedicated to each step motor during operation, its capacity cannot be utilized.

Proper step motor operation also requires the constant, accurate monitoring of command pulses and motor pulses. In the past, the hardware necessary to properly monitor the command pulses and motor pulses has been expensive and designed to isolate the two pulse series, such that miscounts do not occur. Generally, there is up-counter device for each pulse series, interconnected to an adder which supplies a signal digitally representing the difference therebetween.

SUMMARY OF THE INVENTION

In one principal aspect, the present invention is an input control circuit for a step motor of the type having a drive circuit. The input control circuit receives and monitors the series of command pulses provided by an outside source, such as a microprocessor. The drive circuitry provides the motor pulses and further generates a speed signal representing the achievement of slew speed during any one operation.

The input control circuit permits loading by the command pulse source prior to initial motor operation, at a rate above slew speed, and without subsequent dedication. That is, the command pulse rate is not tied to the motor pulse rate, and the command pulse source need not remain interconnected to the input control circuit during subsequent operation of the step motor. Consequently, the command pulse source is freed to load and control the operation of other step motors.

The input control circuit includes three counters, a selector and a comparator. The first counter receives the command pulses and the motor pulses and provides a first count signal based thereon. In the preferred embodiment described, the first count signal increases with each command pulse and decreases with each motor pulse.

The second counter also receives the command pulses and provides a second count signal related thereto. In the preferred embodiment, the second count signal represents one-half of the command pulses received from the command pulse source.

The third counter receives the speed signal and the motor pulses from the drive circuitry. In the preferred embodiment, the third counter counts the number of motor pulses needed to achieve slew speed (as established by the speed signal), and provides a third count signal representative thereof.

The selector is interconnected to the second and third counters and provides a selector signal, derived from the second and third count signals in accordance with the speed signal. If slew speed is achieved, the selector signal represents the third count signal: otherwise the selector signal represents the second count signal. Thus the second counter is operationally significant if slew speed is not achieved, whereas the third counter takes precedent or controls whenever slew speed is reached.

The comparator receives the first count signal and the selector signal. Whenever the two are equal, the comparator provides a deceleration signal to the drive circuit of the step motor. This signal initiates the deceleration in accordance with the speed reached by the step motor during the operation since the selector signal is speed dependent.

As such, the input control circuitry is capable of operating the step motor in accordance with the command signals, yet without dedication of the command signal source. The command signal source can therefore load the input control circuitry with a high rate burst of command pulses and then disconnect, freeing itself to perform other functions, e.g., the control of the other step motors.

It is thus an object of the present invention to provide an input control circuit for a step motor. Another object is an improved input control circuit whereby motor operation is dependent solely upon the number of inputted command pulses and independent of the rate or manner of inputting these command pulses.

Still another object of the present invention is an input control circuit for a step motor whereby a series of step motors can be controlled by a single command pulse source. It is also an object hereof to provide a step motor control which permits "multiplexing" of the command pulse source, such that multiple step motors can be commonly activated. A further object is a solid-state control circuit, readily and inexpensively manufactured and repaired.

In another aspect, the present invention is a pulse separator for incorporation into the first counter of the input control circuit. The pulse separator is adapted to receive both the command pulse series and the motor pulse series and to provide a pair of output signals. The output signals properly sequence the first counter, such that the difference between the number of command pulses and motor pulses is accurately maintained.

More particularly, the pulse separator includes a pair of inputs, a delay circuit, a composite counter and an indicator circuit. The first input receives the command pulse series and responsively provides first count pulses to the delay circuit, the composite counter and the indicator circuit. The delay circuit, in turn, provides a delay signal.

The second input receives the motor pulse series and the delay signal. Responsively the second input provides second count pulses of variable duration (based upon the delay signal) to the composite counter.

The composite counter generates a composite count signal which includes a discreet pulse for each of the first and second count pulses. In timed relationship, the indicator circuit provides an indicator series, including an indicator pulse corresponding to each of the first count pulses.

The first counter responds to the composite count series and the indicator series. In the preferred embodiment described, the counter is set in the up-count mode by the indicator pulses, such that command pulses result in up-counting and motor pulses result in down-counting.

It is therefore another object of the present invention to provide a pulse separator for receiving two pulse series (such as the command pulse series and the motor pulse series) and for providing an output signal representative thereof. Another object is a pulse separator for generating a composite count series representing two input pulse series and for producing an indicator series whereby each of the input pulse series is discernible.

These and other objects, features and advantages of the present invention are set forth or apparent in the following description.

BRIEF DESCRIPTION OF THE DRAWING

A preferred embodiment of the present invention is described with reference to the drawing wherein:

FIG. 4 is a series of time graphs illustrating various voltage waveforms for the pulse separator shown in FIG. 3.

DESCRIPTION OF A PREFERRED EMBODIMENT

Figure 1:
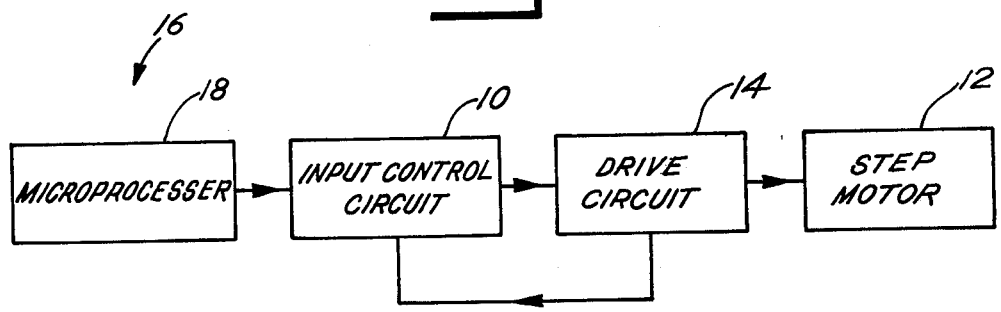
FIG. 1 is a schematic diagram illustrating a step motor, its related drive circuit and the input control circuit comprising the present invention.
Figure 2:
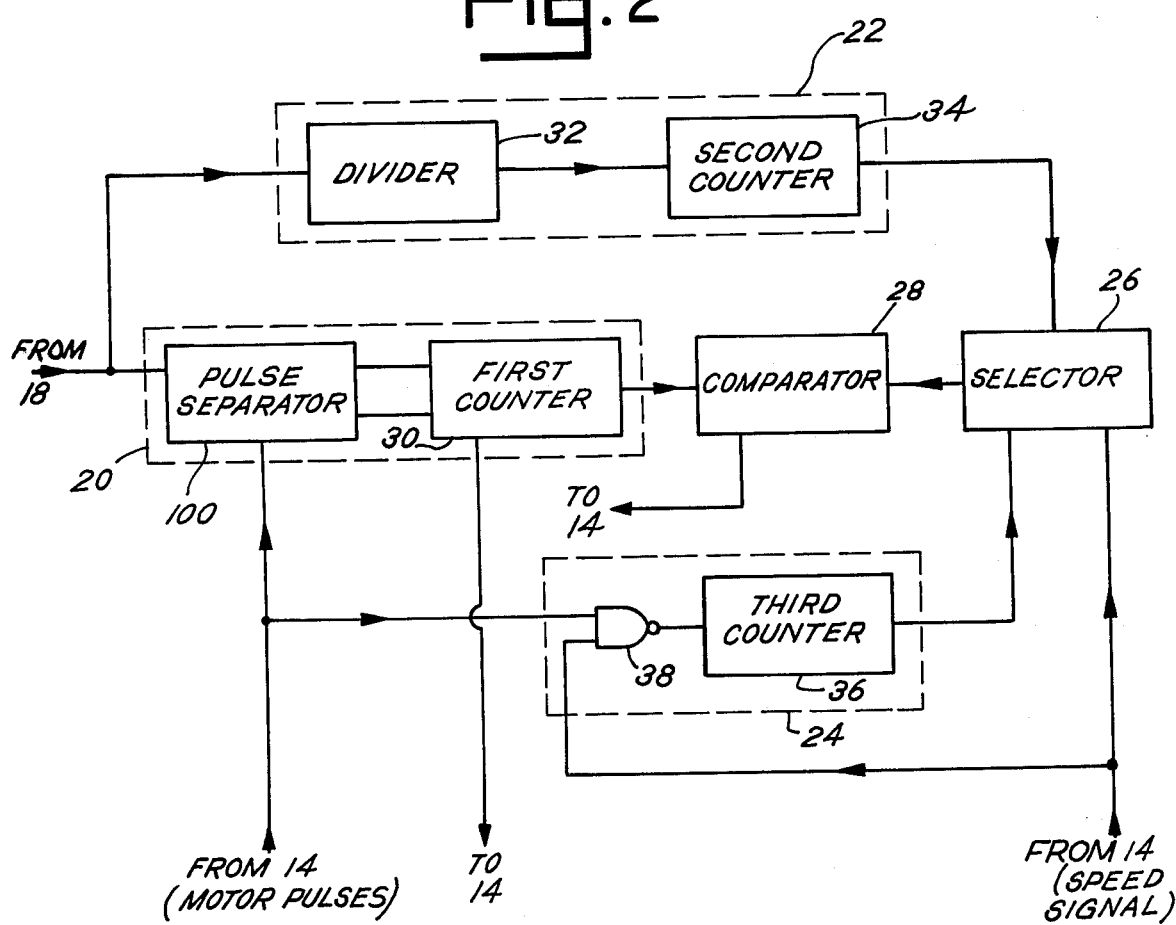
FIG. 2 is a schematic diagram illustrating a preferred embodiment of the input control circuit shown in FIG. 1.
Figure 3:
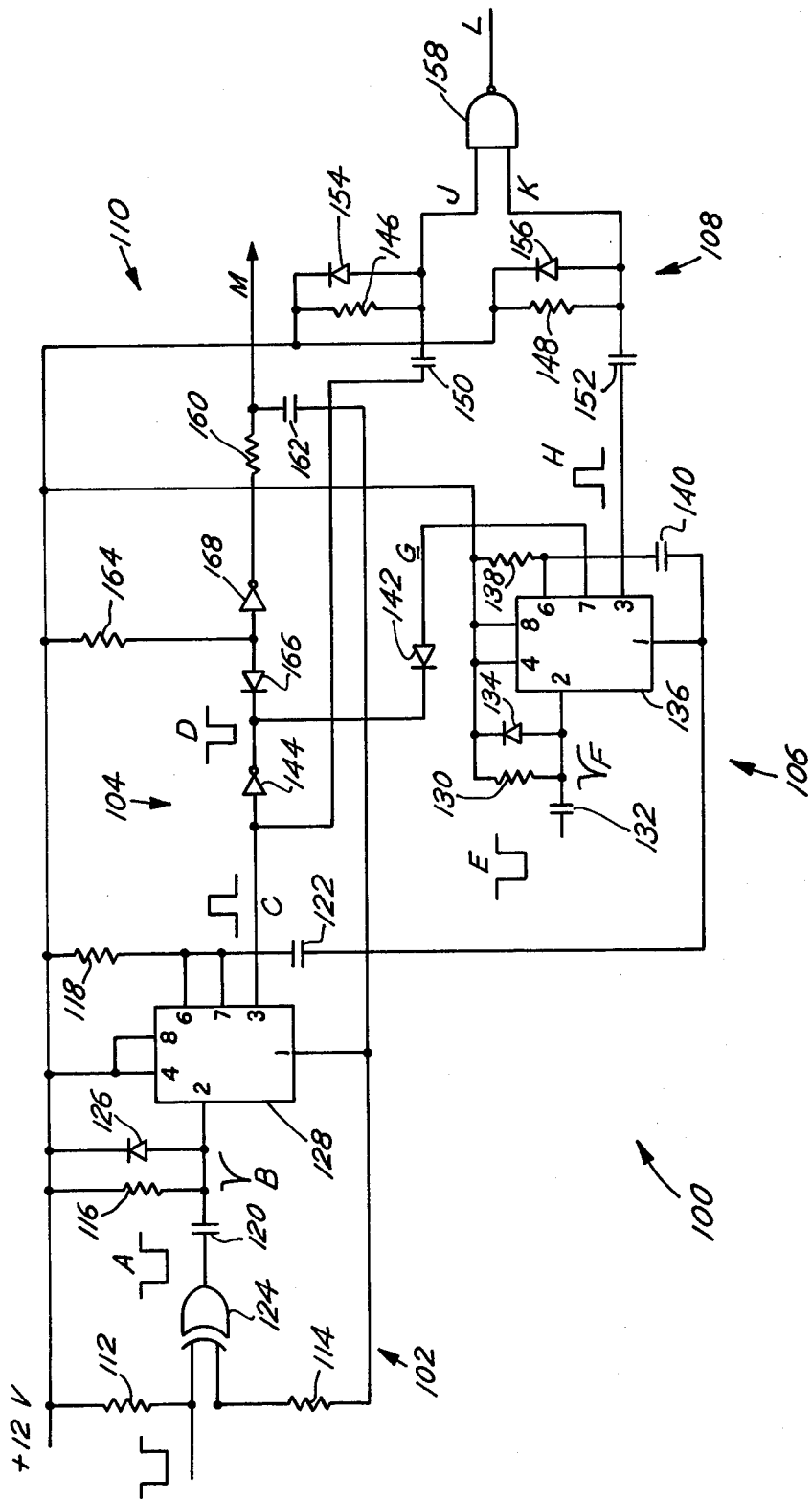
FIG. 3 is an electrical schematic diagram of a preferred embodiment for a pulse separator incorporated as a part of the input control circuit shown in FIG. 2.

A preferred embodiment of the various aspects of the present invention is shown in FIGS. 1-3. The input control circuit is designated 10 and the pulse separator is designated 100.

Referring to FIGS. 1-2, the input control circuit 10 is shown as part of a step motor 12 having a drive circuit 14. As is known in the art related hereto, the drive circuit 14 provides a series of motor pulses to the windings (not shown) of the step motor 12 to provide the energy for movement. Each motor pulse causes the rotor (not shown) of the motor 12 to advance in a particular, controlled direction.

The step motor 12 is operable, under direction of the drive circuit 14, at various speeds. During operation at slew speed, the drive circuit 14 provides a speed signal, i.e., a digital indication that slew speed has been achieved. As shown, the input control circuit 10 receives the speed signal.

The input control circuit 10 also receives a series of command pulses from a command pulse source 16. In this preferred embodiment, the source 16 is a programmable microprocessor 18.

Referring now primarily to FIG. 2, the input control circuit 10 includes first counter means 20, second counter means 22, third counter means 24, selector means 26 and comparator means 28, interconnected as shown. In this preferred embodiment, the first counter means 20 includes the pulse separator 100 and a first digital up/down counter 30.

As described in detail below, the pulse separator 100 receives the command pulse series from the microprocessor 18 and the motor pulse series from the drive circuit 14. In response to the output signals of the pulse separator 100, the first counter 30 up-counts command pulses and down-counts motor pulses. As such, the first counter means 20 receives the command pulses in conjunction with the motor pulses, maintains a first count based thereon, and provides a first count signal to the drive circuit 14 and the comparator means 28. Whenever the first count signal reaches zero in the deceleration sequence, the drive circuit 14 responsively stops the step motor 12.

The second counter means 22 includes, in this preferred embodiment, a divider 32 and a second digital up-counter 34. The divider 32 selectively passes every other command pulse such that the counter 34 maintains a second count based upon one-half of the command pulse issued by the microprocessor 18. As explained below, the second counter means 22 is operationally significant whenever slew speed is not achieved by the step motor 12. As shown, the second count signal provided by the second counter means 22 is received by the selector means 26.

The third counter means 24 includes a third digital up-counter 36 and a NAND gate 38. The inputs to the gate 38 are the motor pulse series and the speed signal from the drive circuit 14. The third counter 36 maintains a third count representing the number of motor pulses utilized to reach slew speed. Once slew speed is reached (as indicated by the speed signal), the gate 38 is closed. The output signal of the third counter means 24 is also received by the selector means 26.

The selector means 26 provides a selector signal dependent upon and in accordance with the speed signal. Whenever slew speed is reached, the selector signal is equivalent to the third count signal provided by the third count means 24. Otherwise, the selector signal represents the second count mantained by the second counter means 22.

The selector signal defines the point of deceleration. In the non-slew condition, the step motor 12 is driven such that the number of steps for acceleration equal the number of steps for deceleration, and that number is one-half of the total motor pulses. The second count signal provided by the second counter means 22 thus defines the point of deceleration for this mode. In the slew mode, the number of steps for acceleration again equals the number of steps for deceleration, but that number is now equivalent to the number of steps made or taken in reaching slew sped. The third count signal thus defines the point of deceleration for the slew mode.

Referring again to FIG. 2, the comparator means 28 receives the first count signal from the first counter means 20 and the selector signal from the selector means 28. With loading, the first count signal is initially at a maximum, decreasing as motor pulses are generated by the drive circuit 14. When the first count signal equals the selector signal, the point of deceleration is reached and the comparator means 28 provides a deceleration signal to the drive circuit 14. Thus, irrespective of the operational mode, the initiation of deceleration is properly sequenced to ensure that motor speed is reduced to EFSS speed prior to the time when the signal from the first counter 30 reaches zero.

The rate of acceleration and deceleration is fixed, linear and substantially equal. The rate is, therefore, independent of the difference between the number of command pulses received by the input control circuit 10 and the number of motor pulses issued by the drive circuit 14.

As is apparent, the rate of entering the command pulse series into the input control circuit 10, as well as the time of entry vis-a-vis motor operation, play no role in the determination of the rate of acceleration or deceleration initiation point. Thus, there is no dependence upon the command pulse source 16 in the determination, and disconnection thereof after loading is possible. As such, the command pulse source 16 need not be dedicated to the step motor 12 during operation thereof, and a single microprocessor 18 may be utilized to direct the operation of several step motors 12. Furthermore, a series of step motors 12 can be loaded and then simultaneously started, as, e.g., by means of a "start" signal issued by the microprocessor 18.

Additionally, the command pulse rate is not related to or limited by the slew speed of the step motor 12. Thus command pulses can be inputted at a rate limited only by the maximum count speed of the input count circuit 10. In this preferred embodiment of the present invention, a count speed in excess of 100 kilohertz is achievable.

Referring now to FIGS. 3 and 4, the components of the pulse separator 100 are shown as first input means 102, delay means 104, second input means 106, count means 108 and control means 110. Although the pulse separator 100 is shown here as a part of the input control circuit 10, it is to be understood that the pulse separator 100 may be used in other analogous applications.

The first input means 102 of the pulse separator 100 includes resistors 112–118, capacitors 120, 122, gate 124, diode 126 and "555" timer 128, interconnected as shown. The first input means 102 receives a first pulse series (the command pulse series in this preferred embodiment), and responsively provides a series of first count pulses. The command pulses are received by the gate 124 and the output thereof is designated "A" in FIG. 4. The first count pulses are shown at "C", as derived from the "555" timer 128. There is one first count pulse for each command pulse, and the duration of each first count pulse is fixed.

The second input means 106 includes a resistor 130, capacitor 132, diode 134 and "555" timer 136, again interconnected as shown, and receives the motor pulse series, designated "E" in FIG. 4. In response, the second input means 106 supplies a series of second count pulses, shown as "H" in FIG. 4. Again there is a one-to-one correspondence, but the duration of the second count pulses is variable and dependent upon the delay means 104.

As shown in FIG. 3, the delay means 104 interposes the first and second input means 102, 106, respectively, and includes a resistor 138, capacitor 140, diode 142 and an invertor 144. The delay means 104 receives the first count pulses from the first input means 102 and responsively provides a delay signal to the second input means 106, or more particularly the "555" timer 136 thereof. In this preferred embodiment, the delay signal, shown at "G" in FIG. 4, is derived by application of an inversion of the first count pulses (the inversion is shown at "D" in FIG. 4) to the R-C circuit including the resistor 138 and capacitor 140. The delay signal ("G") is the voltage across the capacitor 140, and the second count means 106 extends the duration of each second count pulse until the capacitor 140 charges to a predetermined value, as determined by the operating characteristics of the "555" timer 136.

The first and second count pulses are received by the count means 108, which includes resistors 146, 148, capacitors 150, 152, diodes 154, 156, and gate 158. The count means 108 responds to the negative going edge of these count signals and responsively provides a composite count signal, shown at "L" in FIG. 4. As shown, there is a discreet pulse within the composite count signal for each of the first and second count pulses.

The variable duration, or sketching of the second count pulses, is necessary to avoid overlap between the first and second count pulses. Without sketching so as to clearly distinguish the trailing edges of each and every pulse, a second count pulse (derived from a motor pulse) closely timed with a first count pulse (derived from a command pulse) could be lost, with subsequent loss of accuracy.

The first count pulses are also received by the control means 110, which includes a resistor 160 and capacitor 162, interconnected as shown. In this preferred embodiment, the delay signal ("D" in FIG. 4) is re-inverted through the arrangement of a resistor 164, diode 166 and inverter 168 to provide the first count pulse to the control means 110.

In response, the counter means 110 provides an indicator signal (shown as "M" in FIG. 4) to the first counter 30. The indicator signal includes an indicator corresponding to each of the first count pulses, such that the first counter 30 is enabled and up-counts each of the first count pulses. Without enablement resulting from the indicator signal, the first counter 30 properly down-counts the discreet pulses of the composite signal corresponding of motor pulses.

The pulse separator 100 substantially simplifies the hardware necessary for monitoring and accurately counting the command and motor pulses. In combination, the input control circuit 10 and the pulse separator 100 provide an improved and simplified system for controlling the operation of a step motor.

Certain preferred embodiments of the present invention have been described herein. It is to be understood, however, that various modifications and changes can be made without departing from the true scope and spirit of the present invention, as defined in the following claims. These claims are to be intepreted in view of the foregoing specification.

What is claimed is:

1. An input control circuit for controlling a step motor in response to a series of command pulses, said step motor having a drive circuit for generating a series of motor pulses and for providing a speed signal, comprising, in combination:
   first counter means for receiving said command pulses and said motor pulses and for maintaining a first count based thereon, said first counter means providing a first count signal representative of said first count;
   second counter means for receiving said command pulses and for maintaining a second count based thereon, said second counter means providing a second count signal representative of said second count;
   third counter means for receiving said speed signal and said motor pulses and for maintaining a third count based thereon, said third counter means providing a third count signal representative of said third count;
   selector means for receiving said second count signal, said third count signal and said speed signal, said selector means issuing a selector signal derived from said second count signal and said third count signal, in accordance with said speed signal;
   comparator means, interconnected to said first counter means and said selector means, for issuing a deceleration signal in response to said first count signal and said selector signal.

2. An input circuit as claimed in claim 1 wherein said second counter means includes divider means for selectively passing said command pulses, said second count representing one-half of said command pulses received by said input control circuit.

3. An input control circuit as claimed in claim 1 or 2 wherein said speed signal represents the achievement of slew speed by said step motor, said third count representing the number of motor pulses necessary to achieve slew speed.

4. An input control circuit as claimed in claim 3 wherein said selector signal represents said third count signal whenever slew speed is achieved.

5. An input control circuit as claimed in claim 1 wherein said first counter means includes a pulse separator, adapted to receive said command pulses and said motor pulses, and a first counter interconnected thereto.

6. An input control circuit as claimed in claim 5 wherein said pulse separator includes:
   first input means for receiving said command pulses and responsively providing a series of first count pulses;
   delay means, interconnected to said first input means, for producing a delay signal in response to said first count pulses;
   second input means, interconnected to said delay means, for receiving said motor pulses and responsively providing a series of second count pulses, said second input means varying the duration of said second count pulses in response to said delay signal;
   count means for receiving said first count pulses and said second count pulses and responsively providing a composite count signal, said composite count signal including a discreet pulse for each of said first count pulses and said second count pulses; and
   control means for receiving said first count pulses and responsively providing an indicator signal, said indicator signal including an indicator corresponding to each of said first count pulses.

7. An input control circuit as claimed in claim 6 wherein said first counter receives said composite count signal and said indicator signal, said first counter counting said discreet pulses of said composite count signal in accordance with said indicator signal.

8. A pulse separator comprising, in combination:
   first input means for receiving a first pulse series and responsively providing a series of first count pulses;
   delay means, interconnected to said first input means, for producing a delay signal in response to said first count pulses;
   second input means, interconnected to said delay means, for receiving a second pulse series and responsively providing a series of second count pulses, said second input means varying the duration of said second count pulses in response to said delay signal;
   count means for receiving said first count pulses and said second count pulses and responsively providing a composite count signal, said composite count signal including a discreet pulse for each of said first count pulses and said second count pulses; and
   control means for receiving said first count pulses and responsively providing an indicator signal, said indicator signal including an indicator corresponding to each of said first count pulses.

9. A pulse separator as claimed in claim 8 wherein said delay means receives and inverts said first count pulses.

10. A pulse separator as claimed in claim 8 wherein said delay signal is variable.

* * * * *